Aug. 12, 1930.     A. E. PINK     1,772,684
APPLIANCE FOR THE CONTINUOUS FILTRATION OF SLIME
Filed May 12, 1928    3 Sheets-Sheet 2

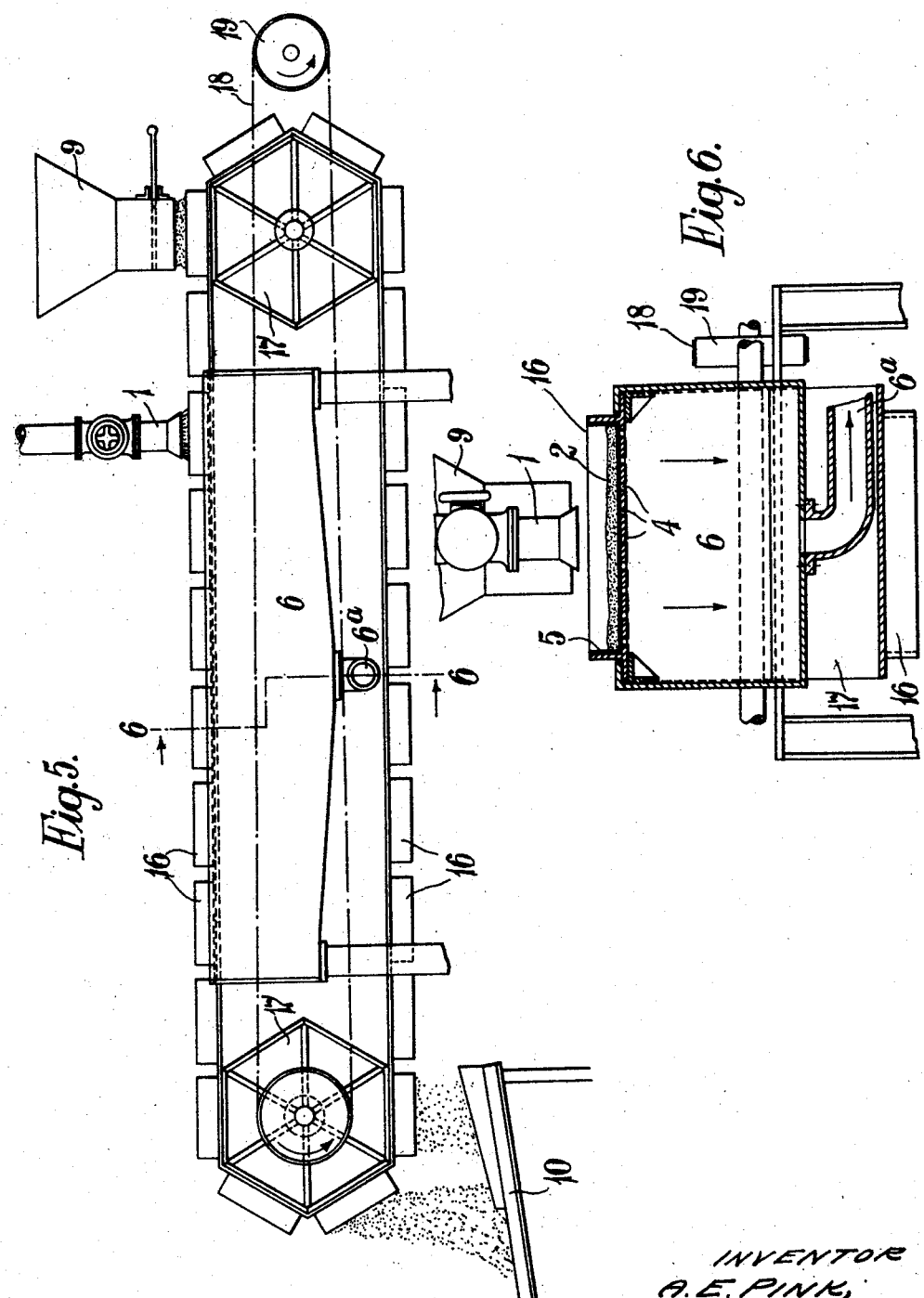

Patented Aug. 12, 1930

1,772,684

UNITED STATES PATENT OFFICE

ARTHUR EDWARD PINK, OF SANDWICK, ORKNEY ISLANDS, SCOTLAND

APPLIANCE FOR THE CONTINUOUS FILTRATION OF SLIME

Application filed May 12, 1928, Serial No. 277,299, and in Great Britian November 14, 1927.

This invention relates to an appliance for the continuous filtration of slimes, more particularly to the clarification of viscous liquors containing fine colloidal solids in suspension.

The clarification of such liquors presents great difficulties owing, in the first place, to the viscosity of the liquid which it is desired to separate from solid matter, and in the second place to the voluminous nature and adsorbent properties of the finely divided solids which it is desired to remove. Whatever form of known appliance and known filtering medium be utilized, the latter whether it be a textile fibrous material, or paper, carbon, glass, sand, porous ware, or the like, rapidly becomes clogged owing to the colloidal solids filling the interstices between the fibres or grains of the filtering medium. Owing to the glutinous and/or spongy character of these solids it is not practicable to remove them by any frictional method such as rubbing or scraping as is done in the case of well known continuous filters of the "Oliver" or "stream-line" type.

In the present invention a bed of sharp granular material in a fine state of division, such as sand, carbon, powdered coke or any pulverulent material which is insoluble in the liquor to be filtered, is employed as filtering material, and is arranged on the perforated top of a low pressure chamber. The slimes are distributed over a large surface of the medium which is of such depth that the liquor which issues from the bottom of the filtering bed is entirely or substantially free from solid matter. As in the case of any other type of filtering appliance, such a filter, if stationary would rapidly become clogged and cease to function. In the present invention this is overcome by giving to the filtering material continuous movement so that fresh surfaces are continuously being played upon by the slime-distributor, and by continuously removing partly "blinded" or clogged filtering material before it has ceased to function and replacing it pari passu with an equivalent supply of fresh material.

Two forms of carrying out my invention are shown in the annexed drawings in which:

Fig. 5 is an elevation of the second form of apparatus used for filtering in accordance with my invention; and Fig. 6 is a section on the line 6—6 of Fig. 5 taken in the direction of the arrows.

Like figures of reference are used to denote like or similar parts in all the figures of the drawings.

Figure 1:
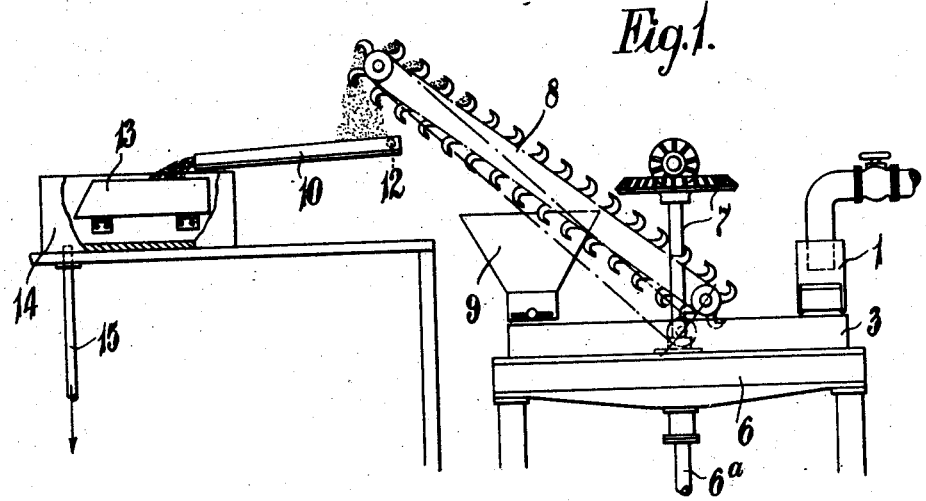
Fig. 1 is a partly sectional elevation of the first form of apparatus used in filtering in accordance with my invention.
Figure 2:
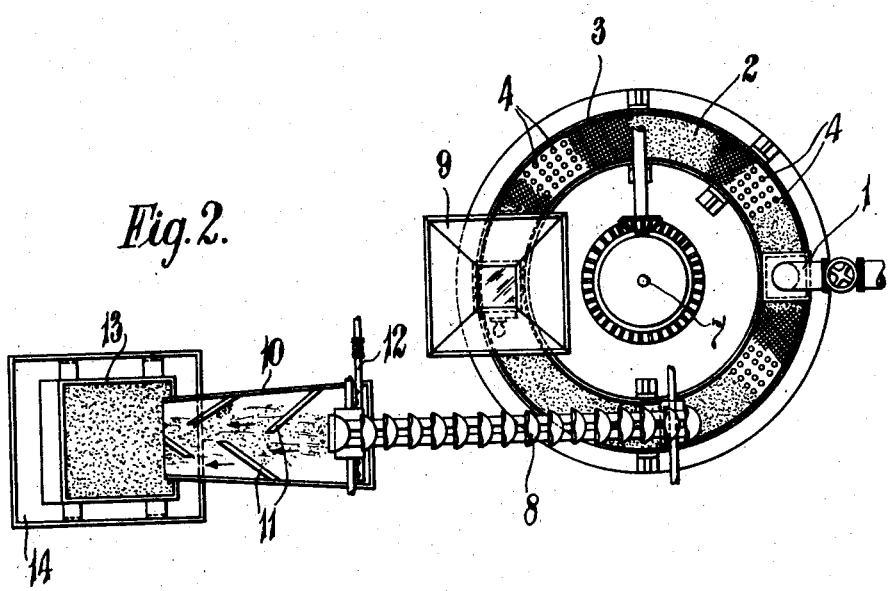
Fig. 2 is a plan view of same.
Figure 3:
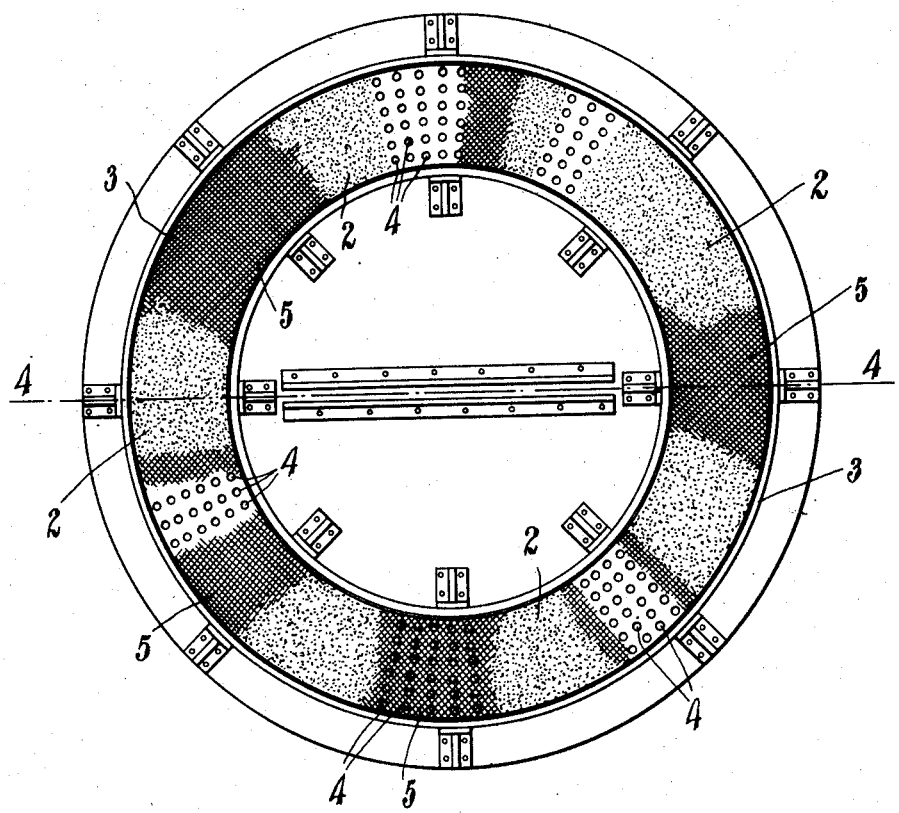
Fig. 3 is a plan view of the filter alone on an enlarged scale.
Figure 4:
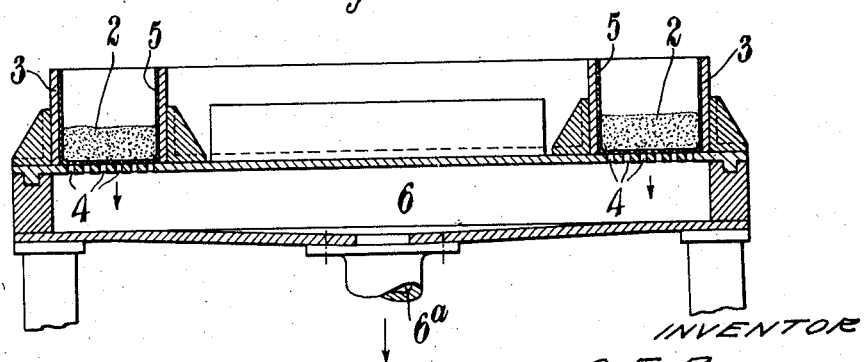
Fig. 4 is a section on the line 4—4 of Fig. 3.

Referring to Figs. 1–4. The slime or pulp to be filtered is run through a distributor 1 in the form of weirs or sprays over the surface of a continuously moving bed of fine granular material 2. The filtering material is contained between the walls of a launder 3 mounted airtightly on the top of a chamber 6 and concentric therewith. In this chamber 6 a pressure less than atmospheric is maintained and that part of the top of the chamber contained between the walls of the launder 3 is perforated as at 4 and acts as the bottom of the launder 3. The launder 3 thus forms an open trough, or it may be divided so as to form more than one trough. A layer of coarse fabric 5, such as canvas, is interposed between the body of the filtering material and the perforated bottom 4 of the open trough or troughs 3 to prevent the mass of filtering material from falling through the perforated bottom of the trough. The chamber 6 has an outlet 6ª for the discharge of the filtrate. Before the speed of filtration has been sensibly reduced the "blinded" granular filtering material in the trough or troughs 3 is discharged and fresh, clean material in equivalent quantity is substituted. The trough 3 is shown as being rotated in a horizontal plane about a central vertical axis 7 by suitable gearing and the "blinded" portion of the filtering material is removed by an appliance of the bucket elevator type 8, an equivalent quantity of material being substituted from a suitably situated valved hopper 9. Suitable provision is made for putting the bucket elevator 8 into or out of operation as may be required.

The "blinded" material removed by the bucket elevator 8 is discharged to a washer consisting of a shallow tray 10 having baffles 11 and a perforated water pipe 12. The material is carried along the tray 10 by the jets of water from the pipe 12 and falls into a removable receptacle 13, where the material settles and the water overflows into a tank 14, whence it is discharged through pipe 15. The washed granular material may be returned for use again and the washings therefrom be returned to the slime to be filtered.

Referring to Figs. 5 and 6. In these drawings the filter consists of a series of open troughs 16, perforated at the bottom and suitably joined together to form an endless band passing over two vertically rotating pulleys 17, one of which is driven by a belt 18 from a suitable driver 19. The top of the low pressure chamber is also perforated and the motion of the filtering bed will then be horizontal and longitudinal, instead of circular as in Figs. 1-4. In place of a bucket elevator to remove the clogged material, the latter will be discharged by gravity on arriving at the end of its horizontal travel, and passing over the pulley 17 to the left of Fig. 5. A fresh supply of filtering material will be charged into the empty troughs 16 from a valved hopper 9 as soon as they have completed their return journey and passed over the pulley 17 to the right of Fig. 5, leaving each individual trough in turn charged with fresh material before coming into the sphere of action of the slime distributor 1.

The discharged material falls by gravity on to a shallow tray 10 and is washed and treated as described with reference to Figs. 1-4.

The rate of delivery of the slime to the filter, the rate of travel of the continuously moving trough or troughs, the rate of delivery of the fresh material to the empty troughs and the rate of removal of the "blinded" material may all be controlled as required by suitable and well known means.

I claim:—

1. In a continuous filtering apparatus, a series of independent open troughs connected in series relation in endless chain form, means for guiding the troughs in a substantially horizontal plane throughout an operative path, means at one end of the operative path and cooperating with the endless chain of troughs to invert said troughs for discharge, means at the initial end of the operative path for delivering filtering media thereto, means arranged beyond said delivery means in the direction of travel of the troughs for directing material to be filtered to the troughs in succession, and a low pressure suction chamber in simultaneous communication with a plurality of said troughs including that to which the material to be filtered is directed together with a number of other troughs in the direction of travel of such troughs, whereby the trough to which the material is initially directed is subjected to the action of the low pressure suction chamber for a material distance following the introduction of the material to be filtered therein.

2. A continuous filtering apparatus including a frame, wheels mounted at the respective ends of the frame, a suction box interposed between the wheels, a plurality of open troughs connected in endless chain relation and adapted to travel over the suction box and over the respective wheels, means for delivering filtering material to the troughs in succession immediately preceding the cooperation of the particular trough and suction box, and means for delivering material to be filtered to each trough in succession at the point of initial cooperation of that trough and suction box.

3. A continuous filtering apparatus including a frame, wheels mounted at the respective ends of the frame, a suction box interposed between the wheels, a plurality of open troughs connected in endless chain relation and adapted to travel over the suction box and over the respective wheels, means for delivering filtering material to the troughs in succession immediately preceding the cooperation of the particular trough and suction box, and means for delivering material to be filtered to each trough in succession at the point of initial cooperation of that trough and suction box, the suction box having a length in the direction of travel of the troughs to at all times act upon a plurality of said troughs.

In testimony whereof I have hereunto set my hand this third day of April, 1928.

ARTHUR EDWARD PINK.